(12) United States Patent
Leighton et al.

(10) Patent No.: US 8,505,714 B2
(45) Date of Patent: *Aug. 13, 2013

(54) BELT

(75) Inventors: Jay Philip Leighton, Charlotte, NC
(US); Sandra Vause Canipe,
Huntersville, NC (US)

(73) Assignee: Forbo Siegling, LLC, Huntersville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/053,974

(22) Filed: Mar. 22, 2011

(65) Prior Publication Data

US 2011/0180375 A1 Jul. 28, 2011

Related U.S. Application Data

(62) Division of application No. 12/049,027, filed on Mar. 14, 2008, now Pat. No. 7,909,719.

(51) Int. Cl.
*F16G 1/00* (2006.01)

(52) U.S. Cl.
USPC .......................................... 198/847; 474/264

(58) Field of Classification Search
USPC .................. 198/847; 474/264, 268
See application file for complete search history.

(56) References Cited

U.S. PATENT DOCUMENTS

| | | | | |
|---|---|---|---|---|
| 4,184,589 A * | 1/1980 | Habegger | | 198/847 |
| 4,526,637 A * | 7/1985 | Long | | 156/137 |
| 4,674,622 A | 6/1987 | Utsunomiya et al. | | |
| 4,813,533 A * | 3/1989 | Long | | 198/847 |
| 5,008,323 A * | 4/1991 | Favstritsky et al. | | 524/469 |
| 5,326,411 A * | 7/1994 | Arnold | | 156/137 |
| 5,422,165 A * | 6/1995 | Arnold | | 428/192 |
| 2004/0132586 A1 * | 7/2004 | Leighton et al. | | 482/54 |

OTHER PUBLICATIONS

Forbo Financial Services AG, International Patent Application No. PCT/US2009/037286; International Search Report and Written Opinion; dated May 28, 2009.
Forbo Financial Services AG, Chinese Patent Application No. 200980115806.2, First Office Action, Jul. 30, 2012.
Forbo Financial Services AG, Chinese Patent Application No. 200980115806.2, Second Office Action, May 22, 2013.

* cited by examiner

*Primary Examiner* — Mark A Deuble
(74) *Attorney, Agent, or Firm* — Michael G. Johnston; Moore & Van Allen PLLC

(57) ABSTRACT

A conveying system comprises a frame and an endless belt moveable relative to the frame. The belt comprises a first fabric layer having an inner surface and an outer surface that at least partially forms an upper surface of the belt. A composition comprising a flame retardant is adhered to the inner surface of the first fabric layer such that the composition at least partially forms the inner surface of the first fabric layer. A second fabric layer has an inner surface and an outer surface that at least partially forms a bottom surface of the belt. A composition comprising polyurethane is adhered to the inner surface of the second fabric layer such that the composition at least partially forms the inner surface of the second fabric layer. An at least substantially solid lubricant composition is impregnated in the second fabric layer and at least partially forms the bottom surface of the belt. The belt is supported on a slider bed for movement across the slider bed.

10 Claims, 3 Drawing Sheets

BELT

CROSS-REFERENCES

This application is a divisional application of U.S. patent application Ser. No. 12/049,027, filed Mar. 14, 2008, now U.S. Pat. No. 7,909,719, the contents of which are incorporated herein by reference.

Some of the material disclosed and claimed in this application is also disclosed in U.S. patent application Ser. No. 10/337,646, filed Jan. 7, 2003, entitled "Treadmill Belt", and U.S. patent application Ser. No. 10/337,706, filed Jan. 7, 2003, entitled "Treadmill Belt", now U.S. Pat. No. 7,549,938. The contents of the above patent applications and patent are incorporated herein by reference in their entirety. Both of the above-referenced applications are currently pending.

BACKGROUND

This invention relates generally to a belt, and more particularly to a lubricated belt for use in applications such as conveying systems.

Conveying systems are used in a number of applications, particularly material handling, package handling and sortation, and the like. One such application is baggage conveying systems in airports.

A conveying system generally comprises an endless belt having a top, or outer, surface and a bottom, or inner, surface; guide rollers around which the belt passes; and spaced support rollers for supporting the belt. The belt is driven, directly or indirectly, by a motor so that the bottom surface of the belt slides across the rollers. In some conveying systems, such as systems for airport baggage handling, the support rollers are replaced by a stationary slider bed, or deck, for supporting the belt. The bottom surface of the belt slides across the upper surface of the slider bed, which is typically formed from steel or other rigid material.

An endless belt may be made by joining opposite ends of a belt material. Belts are often given a one or two-sided coating to provide certain desirable characteristics to the belt. Accordingly, different materials with different characteristics may be used for the coating. For example, various thermoplastic materials, such as PVC or polyurethane, are used for coating a belt for use in conveying systems.

The action of the belt passing over the rollers or across the slider bed generates friction between the bottom surface of the belt and the surfaces of the rollers or the slider bed. Efforts have been made to reduce this friction in order to reduce the power consumption required to drive the belt, friction-induced heating, and friction-induced noise. Reducing the friction can also enhance the operational life of the belt. It is known to reduce the friction of a belt through the use of lubrication on the bottom surface of the belt, and there are several known lubricants and associated methods. The underlying construction of the belt can also affect the resulting friction.

In addition, belts for use in certain applications must meet defined durability and flammability criteria. For example, a belt for use in an airport baggage conveyor system must be puncture and tear resistant and non-flammable. The defined criteria and test methods for belts in the U.S. are specified in ASTM D 378, "Standard Test Methods For Rubber (Elastomeric) Belting, Flat Type", which covers the procedures for evaluating the physical properties of flat conveyor belting, including flammability. Meeting the flammability requirement of ASTM D 378 necessitates applying a flame retardant coating to the belt. However, it has been found that the non-flammable coating can prevent absorption of lubricant coatings.

For the foregoing reasons, there is a need for a belt with a reduced coefficient of friction for use, for example, in a conveyor system. The new belt should be able to meet desired criteria for operability and functionality in a preferred application.

SUMMARY

Accordingly, as described herein, a conveying system is provided, comprising a frame and an endless belt disposed on the frame for movement relative to the frame. The belt comprises a first fabric layer having an inner surface and an outer surface that at least partially forms an upper surface of the belt. A composition comprising a flame retardant is adhered to the inner surface of the first fabric layer such that the composition at least partially forms the inner surface of the first fabric layer. A second fabric layer having an inner surface and an outer surface at least partially forms a bottom surface of the belt. A composition comprising polyurethane is adhered to the inner surface of the second fabric layer such that the composition at least partially forms the inner surface of the second fabric layer. An at least substantially solid lubricant composition is impregnated in the second fabric layer and at least partially forms the bottom surface of the belt. The belt meets ASTM D 378 "Standard Test Method For Rubber (Elastomer) Belting, Flat Type". The belt is supported on a slider bed, and means for driving the belt are provided so that the bottom surface of the belt moves across the slider bed.

BRIEF DESCRIPTION OF THE DRAWINGS

For a more complete understanding of the present invention, reference should now be had to the embodiments shown in the accompanying drawings and described below. In the drawings.

DESCRIPTION

Certain terminology is used herein for convenience only and is not to be taken as a limitation on the invention. For example, words such as "upper," "lower," "left," "right," "horizontal," "vertical," "upward," and "downward" merely describe the configuration shown in the FIGs. Indeed, the components may be oriented in any direction and the terminology, therefore, should be understood as encompassing such variations unless specified otherwise.

Figure 1:
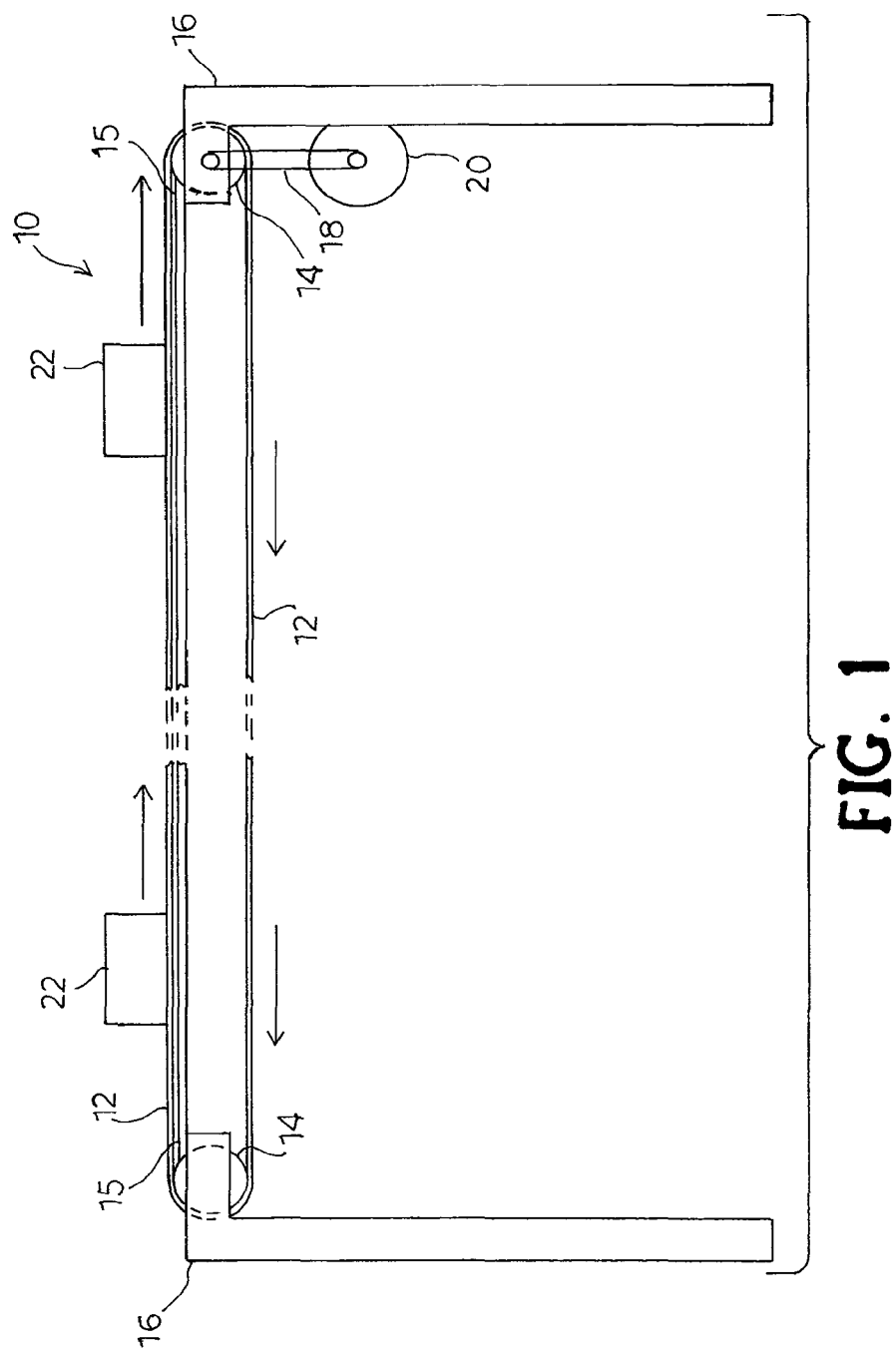
FIG. 1 is a schematic, side elevational view of a portion of an embodiment of a conveyor system for use with a belt according to an embodiment of the present invention.

Referring now to the drawings, wherein like reference numerals designate corresponding or similar elements throughout the several views, FIG. 1 is a schematic side elevational view of a portion of a conveying system generally designated at 10. The conveying system 10 includes an endless belt 12 that passes around a pair of guide rollers 14 rotatably mounted at each end of a frame 16 for carrying the belt 12. The belt 12 is endless by virtue of opposite ends of the belt being joined together at a joint, which is preferably in the form of a splice (not shown). The belt 12 is typically substantially uniform along its length except for at the joint. The belt 12 can be a variety of different lengths and can also be a variety of different widths, which is the distance between side edges of the belt 12. The length of the belt 12 is preferably many times greater than the width.

As shown in FIG. 1, the belt 12 extends around the rollers 14 so that the bottom surface of the upper run of the belt engages a slider bed 15, and the upper surface of the upper run of the belt faces away from the slider bed 15. The upper surface of the belt 12 is shown carrying baggage 22, or the like, which contributes to the friction resulting from the bottom surface of the belt 12 sliding across the slider bed 15. One of the guide rollers 14 is driven, such as via a drive belt 18, by a motor 20 that is mounted to the frame 16. The direction of movement of the belt 12 is denoted by the arrows. It is understood that a variety of other types of mechanisms for driving the belt 12 are also within the scope of the present invention.

Figure 2:
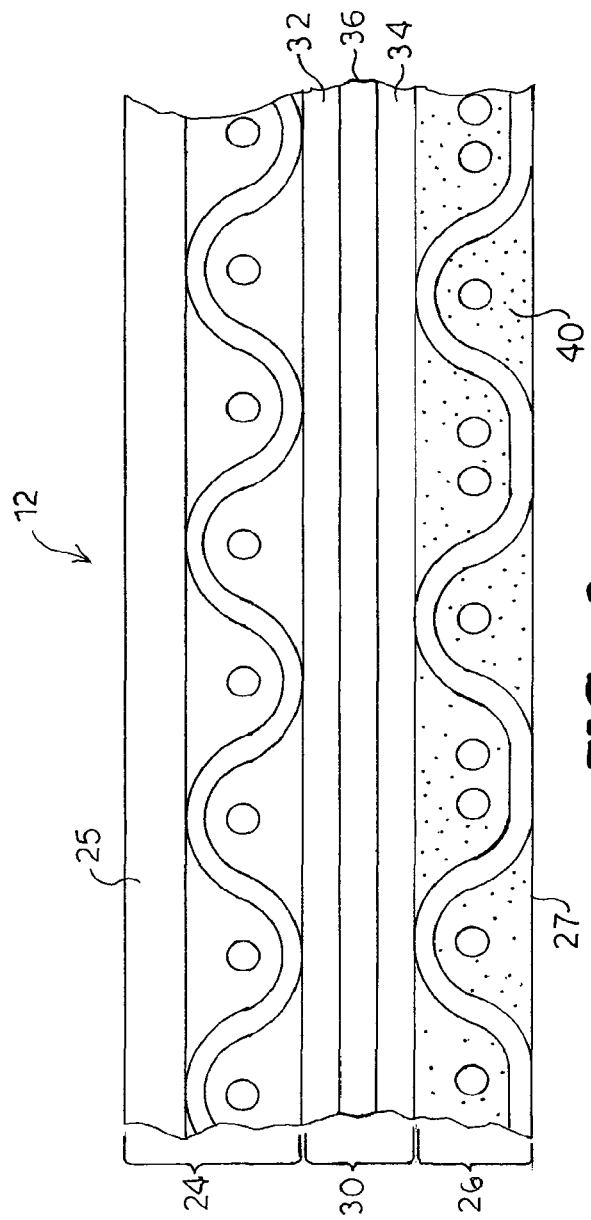
FIG. 2 is a schematic, elevational, partial view of a longitudinally extending portion of an upper run of a belt according to an embodiment of the present invention.

Referring now to FIG. 2, there is shown a schematic partial view of a longitudinally extending portion of the upper run of the belt 12 according to the present invention. The belt 12 includes a top ply 24 and a bottom ply 26 joined by an intermediate layer 30 therebetween. The upper surface of the top ply 24 is substantially planar and is defined by a flame retardant polyvinyl chloride (PVC) coating 25 that is adhered to and covers the top ply 24. The top ply 24 may further comprise a friction surface for moving objects on an incline.

The bottom ply 26 includes a bottom surface 27 which slides across the slider bed 15 and around the guide rollers 14 (FIG. 1). The bottom surface 27 is preferably substantially planar, except for the texture of the fabric of the bottom ply 26 and any discontinuity in the region of the joint. As will be more fully described herein, the construction of the bottom ply 26 provides a low coefficient of friction as against the guide rollers 14 and the slider bed 15.

The intermediate layer 30 is disposed between and joins the top ply 24 and the bottom ply 26. The intermediate layer comprises a flame retardant PVC adhesive coating 32 adhered to the inner surface of the top ply 24. A polyurethane adhesive coating 34 is adhered to the inner surface of the bottom ply 26. A middle layer comprising a flame retardant PVC layer 36 is disposed between the two adhesive coatings 32, 34. The middle layer PVC coating 36 is about 0.5 mm thick and functions to separate the top ply 24 and the bottom ply 26 and further provides lateral stiffness and puncture and tear resistance to the belt 12 construction.

According to the present invention, the belt 12 includes a lubricant coating composition 40 that is impregnated in the bottom ply 26 and is proximate the bottom surface 27 of the bottom ply 26. In FIG. 2, the lubricant coating composition 40 is schematically illustrated by stippling (i.e., dots and flicks) in the bottom ply 26.

Figure 3:
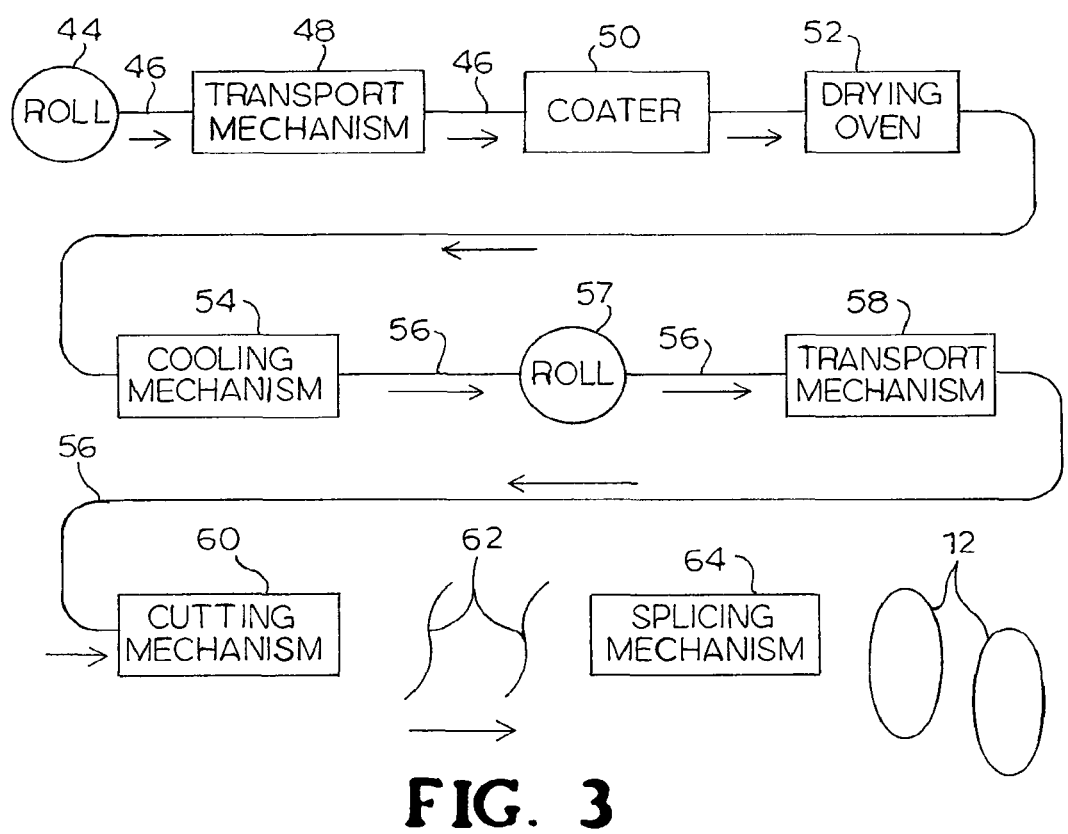
FIG. 3 diagrammatically illustrates a method and apparatus for forming an endless belt from a roll of belt material according to the present invention.

FIG. 3 diagrammatically illustrates a method and apparatus for forming an endless belt 12 according to an embodiment of the present invention. A roll 44 of belt material 46 is provided, for example, a woven polyester fabric for forming the top ply 24. The belt material 46 is unwound from the roll 44 by one or more transport mechanisms 48 arranged along the travel path of the belt material 46.

The belt material 46 is initially passed through a coater 50. Any type of suitable coater known in the art of wide web or textile coating may be used. Exemplary coaters include knife coaters, roll coaters, and the like. In the coater 50, a liquid PVC plastisol primer 25 is applied to (e.g., poured onto, or the like) the upper surface of the fabric of the top ply 24 of the belt material 46. The PVC plastisol primer 25 also contains a flame retardant such as antimony trioxide and aluminum trihydrate, although other suitable flame retardants are available including phosphoric acid ester plasticizer, brominated flame retardant and the like, and an isocyanate bonding agent. The purpose of the PVC plastisol primer 25 is to protect the polyester fabric from burning, and also to act as an adhesive layer for a second, cover coating which may be applied later. In some cases, the PVC plastisol primer 25 also contains pigment and acts as the carrying surface of the finished belt. More particularly, the PVC plastisol primer 25 is applied at a position just upstream from a nip defined between an upper knife edge and a lower roller. The liquid of the coating composition is forced into the fabric of the top ply 24 of the belt material 46 as it passes through the nip.

Thereafter, the belt material 46 with the liquid PVC plastisol primer is cured by transporting the belt material through a drying oven 52 suspended in a tenter frame, or the like. The belt material 46 is then transported through a cooling mechanism 54, where the now coated belt material 56 is cooled, such as by nipping the coated belt material between chilled rollers. The coated belt material 56 is then formed into a roll 57.

Next the fabric of the top ply 24 receives the same PVC plastisol primer 32 on the bottom, or inner, surface. The purpose of this coating of PVC plastisol primer 32 is, again, to protect the polyester fabric from burning and to act as an adhesive layer between the top ply 24 fabric and the intermediate layer 30. The method of applying the second coating of PVC plastisol primer 32 is the same as described above, beginning with the roll of belt material 44. However, in this pass through the apparatus, the belt material 46 is of course already coated on one side with the PVC plastisol primer 25.

A second roll 44 of belt material 46, for example, woven polyester fabric, is provided for forming the bottom ply 26. The belt material 46 is unwound from the roll 44 by the one or more transport mechanisms 48 and passed through the coater 50. In the coater 50, a liquid, solvent-based polyurethane primer 34 is applied to the top, or inner, surface of the fabric of the bottom ply 26 of the belt material 46. The polyurethane primer 34 acts as an adhesive layer between the bottom ply 26 and the intermediate layer 30. A flame retardant additive to the polyurethane primer 34 is optional. Thereafter, the belt material 46 of the bottom ply 26 is cured by transporting through the drying oven 52 suspended in a tenter frame, or the like. The belt material 46 of the bottom ply 26 is then transported through the cooling mechanism 54, where the now coated belt material 56 is cooled, such as by nipping the coated belt material between chilled rollers. The coated belt material 56 is then formed into a roll 57.

Next, the coated top ply 24 and the coated bottom ply 26 are laminated together using a PVC plastisol 36 including a flame retardant. The liquid PVC plastisol 36 is applied to the primer-coated inner surface of either the top ply 24 or the bottom ply 26. The other of the top ply 24 or the bottom ply 26 is then nipped onto the coated fabric ply and passed through the drying oven 52 to cure and solidify the PVC plastisol 36 layer thus forming, for example, a two-ply belt. The polyurethane coating 34 on the inner surface of the bottom ply 26 serves as a barrier coating, preventing significant penetration or absorption of the PVC plastisols 32, 36 of the intermediate layer 30 into the bottom ply 26. This allows the fabric of the bottom ply 26 to remain "open" so that a lubricant coating composition 40 applied to the bottom surface 27 of the bottom ply 26 can substantially fill the interstices between the fibers of the fabric.

Following the lamination step, the belt 12 is run upside down through the apparatus, such that the bottom surface 27 of the bottom ply 26 of the belt 12 is facing upward, since this surface will eventually contact the slider bed 15 and guide rollers 14. In the coater 50, a liquid lubricant composition 40 is applied to the bottom surface 27 of the bottom ply 26 at a position just upstream from the nip so that the liquid lubricant composition 40 is forced into the fabric of the bottom ply 26 as it passes through the nip. The belt with the liquid lubricant composition is cured by transporting through the drying oven 52 suspended in the tenter frame, or the like.

The oven curing of the lubricant coating dries any solvent or water, and also melts the solid component of the lubricant composition 40 allowing the lubricant to flow into the spaces in the fabric of the bottom ply 26. Volatilization of the solvent component of the lubricant composition 40 in the drying oven 52 results in an at least substantially solid lubricant coating 40 being impregnated in the bottom ply 26 of the belt 12.

The dwell time for each incremental portion of the belt 12 within the drying oven 52 is about 1 to 5 minutes, or more specifically about 2 minutes, and the temperature within the oven is about 80° to 200° C., or more specifically about 100° C.

The belt 12 is then transported through the cooling mechanism 54 and formed into a roll 57. Thereafter, and in some cases at a different facility, the coated belt material 56 is unwound from the roll 57 by one or more transport mechanisms 58 positioned along the travel path of the belt. At a cutting mechanism 60, sections of the belt material 62 are cut from the coated belt material 56. At a splicing mechanism 64, each of the sections of belt material 62 is joined end-to-end to form an endless belt, as is known in the art. Most of the joints, or splices, in belts used in airport baggage conveying systems will be metal lacing. The splice may extend at an oblique angle relative to the longitudinally extending edges of the belt 12. The belt 12 is preferably substantially uniform along its length except for in the region of the splice.

It is understood that the process described above is merely exemplary and that a different sequence or additional process steps may be used during the manufacture of an endless belt according to the present invention. For example, additional coatings of PVC, or other polymer, can be applied over the PVC primer coating 25 on the upper surface of the top ply 24 in order to act as a carrying surface. Various properties, such as high friction coefficient, abrasion resistance, or texture can be imparted into this top coating, depending on the specific function of the belt 12. For example, a soft PVC coating with longitudinal grooves might be used for incline conveyors, in order to have a sufficiently high friction coefficient to elevate goods without slippage relative to the top surface. Further, it is possible to use other materials than those described above. For example, fabric made from other fibers such as nylon, aramide, cotton or other materials could be used, and the coatings could be made from polyurethane, polyethylene, silicone rubber, or other suitable materials.

As described above, the belt 12 according to the present invention includes three main layers: the top ply 24, the bottom ply 26, and an intermediate layer 30. The top ply 24 is preferably a plainly woven fabric. The top ply 24 may be formed of any woven fabric exhibiting sufficient durability and flexibility for an intended application. For airport baggage handling, for example, the top ply fabric is designed to be tear and puncture resistant. In one embodiment woven fabric formed from polyester yarns, particularly multifilament polyester yarns having a denier of about 1000, is suitable. As used herein, the term "yarn" refers to any continuous strand of textile fibers, filaments or material in a form suitable for knitting, weaving, or otherwise intertwining to form a textile fabric. In accordance with one embodiment of the present invention, all of the fabrics of the belt 12 are constructed solely of man-made filaments or fibers, although natural fibers may be used in alternative embodiments. In one embodiment, the fabric construction of the top ply 24 is a plain weave, including is thirty-four (34) 2,000 denier polyester multifilament warp yarns per inch of belt width and 25.4 0.4 mm diameter polyester monofilament weft yarns per inch of belt length. This fabric construction provides a laterally stiff belt with high tear and puncture resistance.

The bottom ply 26 may be formed from any fabric providing sufficient strength, durability and frictional properties to the resulting belt 12 construction. According to one embodiment of the present invention, the fabric of the bottom ply 26 includes an effective amount of relatively fine or low twist warp yarns. As used herein, the term "warp yarn" refers to those yarns within a given layer which extend in the longitudinal direction, that is, along the length of the belt 12. Correspondingly, as used herein, the term "weft yarns" refers to those yarns within a given layer that extend in a transverse direction, that is, across the belt 12. Although not wishing to be bound by theory, theoretically the incorporation of relatively fine or low twist warp yarn into the bottom ply 26 decreases the coefficient of friction between the bottom surface 27 of the belt 12 and the slider bed 15 (FIG. 1).

Accordingly, an effective amount of the warp yarns within the bottom ply 26 preferably have a relatively fine denier, such as a denier of less than about 1000, and, more preferably, a denier of about 500 or smaller. As an additional example, an effective amount of the warp yarns within the bottom ply 26 have a denier ranging from about 150 to 500. According to one embodiment of the present invention, 100% of the warp yarns of the fabric of the bottom ply 26 are the relatively fine denier yarn.

The warp yarns of the bottom ply 26 may possess low twist, such as a twist of less than about 2.5 complete turns per inch, and most preferably twist ranging from about 1.5 to 2.0 complete turns per inch. Regarding the warp yarns of the bottom ply 26, a twist of about 2.0 complete turns per inch may be most preferred for facilitating weaving, whereas a twist of about 1.5 complete turns per inch may be most preferred for reducing the friction generated between the bottom ply 26 and the slider bed (FIG. 1).

According to the present invention, the bottom ply 26 warp yarns preferably are formed from polyethylene terephthalate, they are about 500 denier or smaller, and each is twisted about 1.5 to 2.0 complete turns per inch. The bottom ply 26 weft yarns are preferably formed from polyester monofilament fiber, and the monofilament weft yarns each preferably have a diameter of about 0.2 mm. The fabric of the bottom ply 26 is preferably a 2/1 twill weave, wherein the warp yarn preferably passes under two weft yarns for every weft yarn it passes over, so that the long, floating portions of the warp yarns contact the slider bed 15 (FIG. 1) that the belt slides across, with the belt traveling in the direction in which the warp yarns extend. The bottom ply 136 fabric has 45×50 yarns per inch (i.e., 45 warp ends per inch and 50 weft ends per inch). One exemplary commercially available fabric for use in the bottom ply 26 is Style Code No. 5523, produced by Milliken & Company of Spartanburg, S.C.

As mentioned above, the relatively fine size or the low twist of the warp yarns in the bottom ply 26 are believed to reduce friction between the bottom surface 27 of the belt 12 and the slider bed 15 (FIG. 1). According to the present invention, the coefficient of friction between the bottom surface 27 of the belt 12 and the slider bed is preferably further reduced by an at least substantially solid lubricant composition 40 that is impregnated in the fabric of the bottom ply 26 and is proximate the bottom surface 27. As used herein, the term "solid"

means that the solvents employed within the corresponding liquid lubricant composition, from which the solid lubricant composition 40 has been formed, have been substantially removed, such as by volatization and the like. The solid lubricant composition 40 is preferably a mixture, and most preferably is a substantially uniformly dispersed mixture. In FIG. 2, the solid lubricant composition 40 is schematically illustrated by stippling (i.e., dots and flicks) in the bottom ply 26.

The solid lubricant composition 40 preferably includes one or more higher viscosity lubricants, which may be a solid at room temperature, optionally along with one or more lower viscosity lubricants, which may be a liquid at room temperature, and optionally one or more binders, with the lower viscosity lubricant(s) having lower viscosity than the higher viscosity lubricant(s). Exemplary higher viscosity lubricants preferably include waxes, such as natural and synthetic waxes. Natural waxes include waxes derived from animal, vegetable and mineral sources, as well as mixtures thereof. In accordance with one embodiment of the present invention, the higher viscosity lubricant is a vegetable wax, such as carnauba wax, candelilla wax, bay berry wax, sugar cane wax and mixtures thereof.

The solid lubricant composition 40 preferably includes no more than about 60 weight percent of the higher viscosity lubricant, based on the weight of the solid lubricant composition ("bosc"). More specifically, the solid lubricant composition 40 preferably includes from about 30 weight percent to about 60 weight percent higher viscosity lubricant, bosc. Even more specifically, in accordance with the exemplary embodiment of the present invention, the solid lubricant composition 40 includes about 55 weight percent of the higher viscosity lubricant, bosc. In alternative embodiments, the solid lubricant composition includes about 52 weight percent of the higher viscosity lubricant, bosc.

Suitable lower viscosity lubricants include silicones, mineral oils, polyglycols, and mixtures thereof. In accordance with the exemplary embodiment of the present invention, the lower viscosity lubricant includes one or more silicone lubricants. In accordance with the exemplary embodiment of the present invention, the silicone lubricant is a polysiloxane, particularly a polydimethlysiloxane. One exemplary silicone lubricant is Dow Corning 200 Fluid, commercially available from the Dow Corning Corporation of Midland Mich. 200 Fluid is a liquid at room temperature.

The lower viscosity lubricant can be included in any amount providing sufficient lubricity without detrimentally impacting the cohesion of the resulting solid lubricant composition 40. Lower viscosity lubricants preferably exhibit a lower coefficient of friction than higher viscosity lubricants. However, lower viscosity lubricants can impact coating cohesion and adhesive properties. Consequently, the solid lubricant composition 40 preferably includes significantly higher amounts of the higher viscosity lubricant than the lower viscosity lubricant. For example, the weight ratio of the higher viscosity lubricant to lower viscosity lubricant may be 3:2 or lower. In one embodiment, the weight ratio of the higher viscosity lubricant to lower viscosity lubricant may be 1:1 or lower, such as a ratio of about 2:3:1.

In another embodiment of the lubricant composition according to the present invention, the solid lubricant composition 40 preferably includes comparable or even lower amounts of the higher viscosity lubricant than the lower viscosity lubricant. For example, the weight ratio of the higher viscosity lubricant to lower viscosity lubricant may be 3:2 or lower. This weight ratio has been found to be effective for a lubricant composition comprising carnauba wax and Dow Corning 200 Fluid silicone in 100 centistoke viscosity. Advantageously, the weight ratio of the higher viscosity lubricant to lower viscosity lubricant may be 1:1 or lower, such as a ratio of about 2:3. These weight ratios have been found to be effective for lubricant compositions comprising carnauba wax and Dow Corning 200 Fluid silicone in 100 centistoke viscosity. These weight ratios have also been found to be effective for lubricant compositions comprising carnauba wax and Clearco silicone fluid in 50 centistoke viscosity. Clearco silicone fluid is available from Clearco Products of Bensalem, Pa.

Accordingly, the solid lubricant composition 40 preferably includes no more than about 60 weight percent of the lower viscosity lubricant, bosc. More specifically, the solid lubricant composition 40 preferably includes from about 10 weight percent to about 50 weight percent of the lower viscosity lubricant, bosc. Even more specifically, in accordance with the exemplary embodiment of the present invention, the solid lubricant composition 40 includes about 40 weight percent of the lower viscosity lubricant, bosc.

The lubricant composition may further comprise surfactant and heat stabilizer. Surfactant may be present in an amount of about 8 weight percent of the surfactant, bosc. Stabilizer may be present in an amount of about 0.5 weight percent of the stabilizer, bosc.

The optional binder within the solid lubricant composition 40 may serve as an adhesive agent to provide bonding of lubricant 40 to the fabric of the bottom ply 26, as well as binding silicone oil into the coating preventing migration. Consequently, exemplary binders for use in the present invention include any film forming polymer known in the art that is compatible with the remaining components within the solid lubricant composition 40 and provides sufficient bonding properties and flexibility. Suitable binders include polyurethanes, acrylic polymers, vinyl polymers, and the like, including mixtures and copolymers thereof. In accordance with the exemplary embodiment of the present invention, the binder is preferably polyurethane. Suitable polyurethanes include both polyester polyurethanes and polyether polyurethanes. In accordance with the exemplary embodiment of the present invention, the polyurethane is a polyester polyurethane. One suitable commercially available polyester polyurethane is ESTANE™ 5712 F30 polyurethane from Nonwoven, Inc. of Cleveland, Ohio.

The binder may be present in the solid lubricant composition 40 in any amount effective to provide sufficient bonding in the bottom ply 26. For example, the binder may be present in the solid lubricant composition 40 in an amount ranging from about 10 to 50 weight percent, bosc. Preferably, the solid lubricant composition 40 includes about 20 weight percent to about 30 weight percent binder, bosc. More preferably, the solid lubricant composition 40 includes from about 25 weight percent to about 30 weight percent binder, bosc, such as an amount of about 29 weight percent or about 28 weight percent.

In accordance with the exemplary embodiment of the present invention, the solid lubricant composition may optionally further include one or more bonding agents, e.g. crosslinkers, to crosslink the binder and further promote cohesion within the solid lubricant composition 40 and adhesion in the bottom ply 26. Any suitable crosslinker known in the art for use in conjunction with a given binder may be employed. Exemplary crosslinkers include isocyantes, such as polyisocyanates and diisocyantes, peroxides, epoxies, polyfunctional amides and mixtures thereof. In accordance with the exemplary embodiment of the present invention, a polyisocyanate crosslinking agent may be included in solid lubricant compositions employing a polyurethane binder.

The crosslinker is included in the composition in amounts effective to provide a sufficient amount of crosslinking within the binder without imparting excessive stiffness to the resulting solid lubricant composition 40. Preferably, the crosslinker is present in the solid lubricant composition in amounts ranging from about 2.5 to 10 weight percent, bosc. In accordance with the exemplary embodiment of the present invention, the crosslinker is preferably present in an amount of about 4.9 weight percent, bosc.

In accordance with the exemplary embodiment of the present invention, the solid lubricant composition 40 is formed from a liquid lubricant composition that is applied to, e.g. coated onto, the bottom ply 26 as a liquid lubricant composition. The solvents are then removed from the liquid lubricant composition, typically by drying and the like, resulting in a layer of the solid lubricant composition 40 substantially covering at least a portion of the outermost surface of, and substantially impregnated into, the fabric of the bottom ply 26.

The liquid lubricant composition 40 may be formed by dispersing or dissolving appropriate amounts of the higher viscosity lubricant and the lower viscosity lubricant in a lubricant solvent. The higher viscosity lubricant and lower viscosity lubricant are normally incorporated into the liquid lubricant composition in an undiluted form. The optional binder composition preferably contains the binder polymer dispersed or dissolved in an appropriate binder solvent. Suitable binder solvents include polar organic solvents, such as acetone and methyl ethyl ketone ("MEK") and mixtures thereof. In accordance with the exemplary embodiment of the present invention, the binder solvent is a mixture of acetone and MEK, particularly a mixture containing about 58 parts acetone per about 42 parts MEK.

The lubricant solvent may be water, unless an isocyanate bonding agent is used. The lubricant solvent can also be any organic solvent capable of dispersing the higher and lower viscosity lubricants and binder composition. A suitable organic lubricant solvent is a ketone based solvent, such as cyclohexanone. It is understood that carnauba wax is highly insoluble such that the carnauba wax is emulsified rather than dissolved.

The liquid lubricant composition is preferably formed by initially combining the higher and lower viscosity lubricants with the lubricant solvent and heating the initial mixture to an elevated temperature, such as a temperature of about 80° C. while the initial mixture is under low speed agitation. Upon dissolution of the higher viscosity lubricant, the initial mixture may be allowed to cool to a lower, yet elevated, temperature, such as a temperature of about 55° C. Upon cooling to the lower temperature, the optional binder composition may be added, after which the agitation speed may be increased and the liquid lubricant composition may be agitated for a period of about 5 minutes. The liquid lubricant composition is typically allowed to sit for at least 24 hours, after which the liquid lubricant composition is stirred and the viscosity is adjusted with an appropriate organic solvent, such as acetone. The viscosity of the liquid lubricant composition is preferably about 4000 cps (Brookfield viscosity based on a 20 rpm spindle speed).

In the embodiments of the present invention which further include a crosslinking agent, a bonding agent composition may be added to the liquid lubricant composition. The bonding agent composition preferably includes the crosslinker dissolved or suspended in an appropriate organic solvent. For example, the bonding agent composition may include a polyisocyanate crosslinking agent dissolved or suspended within ethyl acetate. One exemplary bonding agent composition is DESMODUR RC, commercially available from Bayer Corporation of Pittsburgh, Pa., which contains about 30% polyisocyanate in ethyl acetate. The bonding agent composition is preferably added to the liquid lubricating composition at room temperature under high speed agitation. The resulting liquid lubricant composition is allowed to agitate at least about 3 minutes prior to use. As known in the art, the shelf life of compositions containing bonding agents may be limited. Accordingly, the bonding agent composition may be added to the liquid lubricant composition either immediately prior to or a few hours before its application to the fabric of the bottom ply 26.

The liquid lubricant composition is applied to the belt material using the equipment and processes described above. More particularly, a coater, such as a knife coater, is used to apply the liquid lubricant composition to the bottom ply of the belt material and the coated belt material is subsequently dried. The various solvents within the liquid lubricant composition are volatilized in the drying oven 52 (FIG. 3) following the coating process, so that the resulting solid lubricant composition 40 solidifies in the fabric of the bottom ply 26. The solid lubricant composition 40 is preferably at least substantially in solid form at room temperature (e.g., 72.degree. F.). The coated belt 12 preferably has solid lubricant composition coat weight ranging from about 1 oz/sq. yd to about 5 oz/sq. yd. Most preferably, the solid lubricant composition 40 is present in the belt 12 in an amount of about 72 g/m2 (2.1 oz/sq. yd).

Since the belt lubricant 40 is at least substantially solid after drying, migration of the lubricant 40 is substantially precluded. Also, due to the substantially solid nature of the lubricant 40, it can advantageously be applied to rolls of belting material before sections are cut therefrom and spliced, because the solid lubricant does not substantially interfere with the splicing or adhesion. Additionally, the fabric of the bottom ply 26 may be saturated with the lubricant composition 40, with the lubricant composition intimately impregnated in the fabric bottom ply, and not just on the bottom surface, so that any loss of lubricant from the belt is insubstantial.

The depth of absorption of the lubricant composition 40 into the bottom ply 26 may be controlled such that the solid lubricant composition 40 is not dispersed throughout the thickness of the fabric of the bottom ply 26. This may be accomplished during curing of the belt 12 by controlling the temperature of the oven and the dwell time within the oven after application of the liquid lubricant composition 40. Lower temperature or less dwell time will lessen the depth of absorption of the lubricant composition 40 into the fabric of the bottom ply 26. Another method of controlling the depth of absorption of the lubricant composition into the fabric is by controlling the solids content of the lubricant composition 40. Reducing the solids content of the lubricant composition 40 will lessen the depth of absorption into the bottom ply 26. In addition, the amount of binder will affect the rheology of the lubricant composition 40, which effects absorption into the fabric. Specifically, increasing the amount of binder in the lubricant composition 40 will lessen the depth of absorption into the bottom ply 26.

Preferably, the binder/bonding agent in the lubricant composition 40 substantially keeps the lubricant(s) on the belt 12 so that relubrication is not necessary. The low viscosity lubricant in the lubricant composition 40 improves lubrication, but the proportion is sufficiently small so that the lubricant composition 40 is still substantially solid at room temperature.

Advantageously, the small proportion of low viscosity lubricant does not substantially migrate or substantially interfere with belt splicing.

The endless belt, as described herein, is used in conveyor systems. It is understood that the belt of is not limited to the type of conveyor system 10 illustrated and described with reference to FIG. 1, because the belt 12 of the present invention operates advantageously with a wide range of different types of conveyor systems, and can be used in a wide range of other applications in which belts are used. In one example, the endless belt is used in a treadmill with a waxed or unwaxed deck.

Similarly, the lubricant compositions described herein can be applied to many different types of belts, can be used on items other than belts, and can be considered to be isolated articles of manufacture (e.g., separate from any belts, conveyor systems, etc.) For example, it is within the scope of the present embodiments for the lubricant 40 to be used with (e.g. applied to and preferably impregnated into the bottom surfaces of) conventional conveyor system belts. Likewise, the belt herein described can be used in combination with many different types of lubricants or can be considered to be isolated articles of manufacture (e.g., separate from any lubricant etc.).

Although the present invention has been shown and described in considerable detail with respect to a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. Accordingly, we intend to cover all such modifications, omission, additions and equivalents as may be included within the spirit and scope of the invention as defined by the following claims. In the claims, means-plus-function clause(s) are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

We claim:

1. A conveying system, comprising:
   a frame;
   an endless belt disposed on the frame for movement relative to the frame, the belt comprising
      a first fabric layer having an inner surface and an outer surface that at least partially forms an upper surface of the belt,
      a composition comprising a polyvinyl chloride plastisol primer, the composition adhered to the inner surface of the first fabric layer such that the composition at least partially forms the inner surface of the first fabric layer,
      a second fabric layer having an inner surface and an outer surface that at least partially forms a bottom surface of the belt,
      a composition comprising polyurethane, the composition adhered to the inner surface of the second fabric layer such that the composition at least partially forms the inner surface of the second fabric layer,
      a composition comprising a flexible polyvinyl chloride plastisol disposed between the inner surface of the first fabric layer and the inner surface of the second fabric layer for joining the first fabric layer and the second fabric layer, and
      an at least substantially solid lubricant composition impregnated in the second fabric layer and at least partially forming the bottom surface of the belt;
   a slider bed for supporting the belt; and
   means for driving the belt so that the bottom surface of the belt moves across the slider bed.

2. A conveying system as recited in claim 1, wherein the first fabric layer comprises a woven fabric.

3. A conveying system as recited in claim 1, wherein the first fabric layer comprises a polyester fabric.

4. A conveying system as recited in claim 1, further comprising a composition including polyvinyl chloride, the composition adhered to the outer surface of the first fabric layer such that the composition at least partially forms the outer surface of the first fabric layer.

5. A conveying system as recited in claim 4, wherein the composition comprising the polyvinyl chloride adhered to the outer surface of the first fabric layer further comprises a flame retardant.

6. A conveying system as recited in claim 1, wherein the composition comprising the polyvinyl chloride platisol primer adhered to the inner surface of the first fabric layer further comprises an adhesive.

7. A conveying system as recited in claim 1, wherein the second fabric layer comprises a woven fabric.

8. A conveying system as recited in claim 1, wherein the second fabric layer comprises a polyester fabric.

9. A conveying system as recited in claim 1, wherein the composition including the polyvinyl chloride plastisol between the composition adhered to the inner surface of the first fabric layer and the composition adhered to the inner surface of the second fabric layer comprises a flame retardant.

10. A conveying system as recited in claim 1, wherein the composition comprising the polyvinyl chloride platisol primer adhered to the inner surface of the first fabric layer further comprises a flame retardant.

* * * * *